(12) United States Patent
Burch, V et al.

(10) Patent No.: US 11,404,891 B2
(45) Date of Patent: Aug. 2, 2022

(54) UNIT LOAD DEVICE AND PANEL ENHANCEMENTS FOR A UNIT LOAD DEVICE

(71) Applicant: FEDEX CORPORATE SERVICES, INC., Collierville, TN (US)

(72) Inventors: Reuben F. Burch, V, Columbus, MS (US); Charles Hawk, Collierville, TN (US); Katherine King, Collierville, TN (US); Howard McKinney, Collierville, TN (US); Aaron Prather, Collierville, TN (US); Ronald W. Thomas, Collierville, TN (US)

( * ) Notice: Subject to any disclaimer, the term of this patent is extended or adjusted under 35 U.S.C. 154(b) by 113 days.

(21) Appl. No.: 16/458,862

(22) Filed: Jul. 1, 2019

(65) Prior Publication Data

US 2020/0036201 A1    Jan. 30, 2020

Related U.S. Application Data

(60) Provisional application No. 62/711,706, filed on Jul. 30, 2018.

(51) Int. Cl.
*H02J 7/00* (2006.01)
*B65D 88/02* (2006.01)
*H02J 7/02* (2016.01)
*H02J 7/35* (2006.01)

(52) U.S. Cl.
CPC ............ *H02J 7/0045* (2013.01); *B65D 88/02* (2013.01); *H02J 7/025* (2013.01); *H02J 7/35* (2013.01)

(58) Field of Classification Search
CPC ...................................................... H02J 7/045

USPC .......................................................... 320/107
See application file for complete search history.

(56) References Cited

U.S. PATENT DOCUMENTS

| | | | |
|---|---|---|---|
| 6,542,114 B1 | 4/2003 | Eagleson et al. | |
| 9,525,193 B2 * | 12/2016 | Lee | ...... H01M 10/465 |
| 2008/0145592 A1 | 6/2008 | Johnson | |
| 2011/0247958 A1 | 10/2011 | Lucas et al. | |
| 2015/0046364 A1 * | 2/2015 | Kriss | ...... G06Q 10/0833 705/333 |
| 2016/0079909 A1 * | 3/2016 | Franklin | ............ F24S 25/632 211/41.1 |
| 2017/0048800 A1 * | 2/2017 | Tal | ............ H04W 52/0229 |

FOREIGN PATENT DOCUMENTS

| | | |
|---|---|---|
| WO | 2010040085 A2 | 4/2010 |
| WO | WO2010/040085 A2 * | 4/2010 |

OTHER PUBLICATIONS

PCT Application No. PCT/US2019/041276 International Search Report and Written Opinion, dated Oct. 3, 2019.

* cited by examiner

*Primary Examiner* — Edward Tso
*Assistant Examiner* — Ahmed H Omar
(74) *Attorney, Agent, or Firm* — Withers & Keys, LLC

(57) ABSTRACT

A replaceable charging panel is provided for a unit load device having a plurality of walls. The replaceable charging panel may have a base member that is configured to removably attach to a first wall of the plurality of walls of the unit load device; and an electrical charging device mounted to the base member. A unit load device is also provided that has a plurality of walls and a replaceable charging panel.

22 Claims, 4 Drawing Sheets

UNIT LOAD DEVICE AND PANEL ENHANCEMENTS FOR A UNIT LOAD DEVICE

FIELD OF THE DISCLOSURE

The present disclosure generally relates to systems, apparatus and methods of improving the utility of containers used in shipping, and, more particularly, to improving the utility of unit loading devices used for shipping cargo on planes and other vehicles.

BACKGROUND

In the airline industry, and other industries, it is a standard practice to compartmentalize the cargo which is to be carried on board a large aircraft, or other vehicle. This can be done by separating the cargo into separate groups and placing these groups of cargo into individual containers which are commonly referred to as unit load devices (ULDs). Due to practical considerations and regulatory requirements, the shape, size and maximum weight of a ULD for a particular type of aircraft have been largely standardized.

In some cases, ULDs are shaped as basically a rectangular parallelepiped with the addition of one or more slopes surfaces that ULD more closely mimics the shape of the aircraft's fuselage when the ULD is placed in the aircraft's cargo compartment. ULDs can be made of several panels which are joined together, either with or without an internal or external framework, to define an enclosed or partially enclosed volume. The ULD can also include some sort of access door, hatch, or curtain, for example, to allow of the cargo to be placed in, and removed from, the ULD.

A ULD can include some sort of pouch or placard holder that holds or displays identifying information relevant to the flight on which the ULD is to be loaded and/or the contents of the ULD.

The inventors recognized that shipping companies can benefit from a ULD that can communicate various information in a more efficient and precise manner.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a replaceable charging panel for a unit load device, the unit load device having a plurality of walls, the replaceable charging panel includes a base member that is configured to removably attach to a first wall of the plurality of walls of the unit load device; and an electrical charging device mounted to the base member.

In another aspect of the disclosure, a unit load device includes a plurality of walls; and a replaceable charging panel having a base member that is removably attach to a first wall of the plurality of walls, and an electrical charging device mounted to the base member.

In yet another aspect of the disclosure, a mounting device is configured to mount a replaceable charging panel to a unit load device, the unit load device having a plurality of walls, the replaceable charging panel having a base member that is removably attachable to a first wall of the plurality of walls of the unit load device, the replaceable charging panel having an electrical charging device mounted to the base member. The mounting device includes a receiving member attached to the first wall of the unit load device, the receiving member being configured to receive the base member; a fastener that is configured to extend through the base member and the receiving member; and a fastener receiving part attached to the unit load device, the fastener receiving part receiving the fastener such that the fastener removably attaches the base member of the replaceable charging panel to the unit load device when the fastener engages the fastener receiving part. The fastener and the fastener receiving part transition from an unengaged position to a fully engaged position when the fastener is rotated less than 180 degrees relative to the fastener receiving part.

In some embodiments of the disclosure, the base member of the replaceable charging panel is configured to be a portion of a wall of the replaceable charging panel. In some embodiments of the disclosure, the base member is configured to be one of several removable panels that together form a part of one of the walls. Some embodiments of the disclosure include an electric power source mounted to the base member. In some embodiments of the disclosure, the electric charging device charges the electric power source. In some embodiments of the disclosure, the electric charging device is one of a solar panel, a kinetic movement charger, an induction charging panel, an ambient RF charger, and replaceable batteries. Some embodiments of the disclosure include a sensor that is configured to sense a parameter of the unit load device. In some embodiments of the disclosure, the sensor detects one of light, smoke, chemicals, cargo weight, weight shift, movement, temperature, and pressure. Some embodiments of the disclosure include a wireless communication device that communicates information regarding the unit load device. In some embodiments of the disclosure, the plurality of walls includes a side wall, a top wall, and a bottom wall. In some embodiments of the disclosure, the base member of the replaceable charging panel is attached to one of the walls. Some embodiments of the disclosure include quick attachment connectors that are configured to removably attach the replaceable charging panel to the unit load device. In some embodiments of the disclosure, the quick attachment connectors are turnlock fasteners.

Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

DESCRIPTION OF THE EMBODIMENTS

Figure 1:
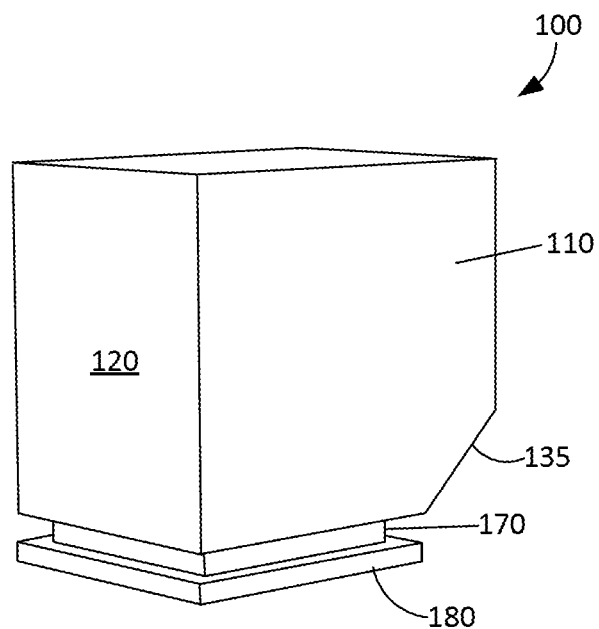
FIG. 1 is a perspective view of a unit load device in accordance with an embodiment of the invention.

Reference will now be made in detail to exemplary embodiments. Wherever possible, the same reference numbers are used in the drawings and the description to refer to the same or like parts.

In general, the following describes various embodiments having a replaceable charging panel as part of a container such as, for example, a unit load device (ULD).

ULDs can have various structures such as, for example, an internal frame to which panels are attached to form the enclosure that creates the container. Other ULDs can have an external frame to which panels are attached to form the enclosure that creates the container. The frame, whether internal or external, can be a metal such as, for example, aluminum, or can be a plastic or composite material. ULDs can also be a frameless design in which the panels that form the enclosure are attached to each other instead of to a frame. With a frameless design the panels are often stronger than with a framed design because the panels must provide the structural support for the container and its contents.

In most cases, it is advantageous to make the ULD as light as possible in order to reduce fuel costs associated with transporting the ULD. However, the cost of manufacturing the ULD must be balanced with the potential saving in fuel costs. While a particular material may be very light, its cost may be prohibitive from an economic recovery standpoint.

It is also advantageous to use fire proof/suppressant/resistant materials for either the skeletal frame or the panels of the ULD. Such materials may also be resistant or capable of withstanding exposure to hazardous, corrosive, and oxygenated materials as well as lithium ion based products, chemicals in liquid form, dry ice, and other form of chemicals. Fire proof, suppressant, and/or resistive materials may be included in the makeup of composite materials used for parts of the ULD in order to create or enhance all fire support capabilities of the ULD.

Today's electronics provide opportunities to equip ULDs with various useful features. Central to the purpose of a ULD is the ability to accurately track its location and know its contents. Electronic devices can be built into or attached to a ULD to store an identification number or code so that the identification of the ULD can be easily discovered or verified. In addition, such devices can provide the location of the ULD. Further, these devices can include other information. This information can include the type of contents of the ULD such as, for example, contents that are hazardous, need refrigeration, are controlled by special regulations, or have specific temperature of pressure limitations. This information can also include the specific contents of the ULD such as, for example, customer name, customer address, and detailed contents of each package in the ULD. Other non-exclusive examples of information that can be stored in an electronic device on a ULD are destination, current flight number, connecting flight number, actual minimum and maximum temperatures observed by the ULD, actual minimum and maximum pressures observed by the ULD, actual maximum acceleration observed by the ULD (as a measure of shock), and other information.

Other electronic devices can be integrated into or attached to a ULD. Non-exclusive examples of such devices may include sensors, power storage, electrical chargers, communication devices, and interfaces with other technologies in the ULD.

Figure 2:
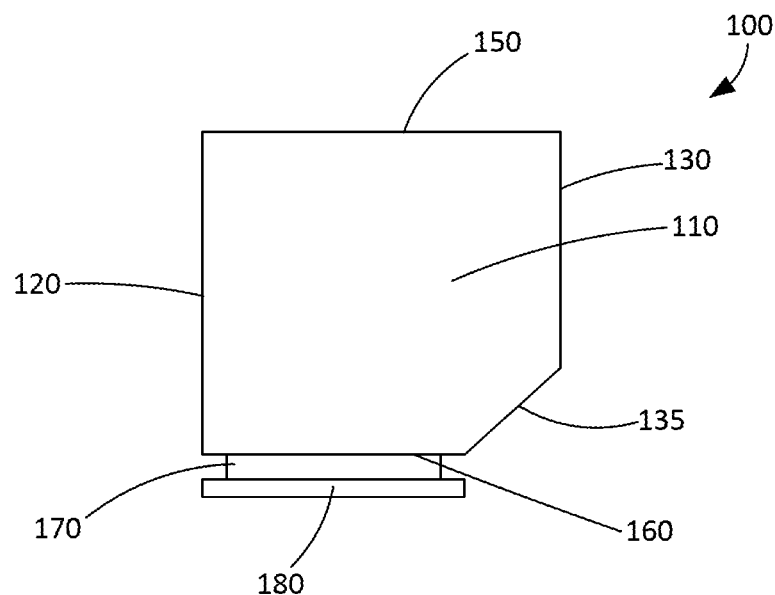
FIG. 2 is a side view of a unit load device in accordance with an embodiment of the invention.

A schematic view of an exemplary ULD in accordance with an exemplary embodiment of the invention is shown in FIG. 1. This example of a ULD 100 is essentially a rectangular parallelepiped modified with a sloped surface 135 in the place of one of the edges. FIG. 1 shows a first side 110 and a second side 120 and a foundation having a pedestal 170 and a base 180. FIG. 2 is a side view of ULD 100 and shows more clearly the sloped surface 135. Sloped surface 135 is provided so that ULD 100 follows more closely the shape of the inside of a plane's cargo area. Because the cargo areas normally follow the circular shape of the plane's fuselage, sloped surface 135 allows ULD 100 to more completely fill the cargo area. Also shown in FIG. 2 are bottom 160, top 150 and side 130 of ULD 100.

Figure 3:
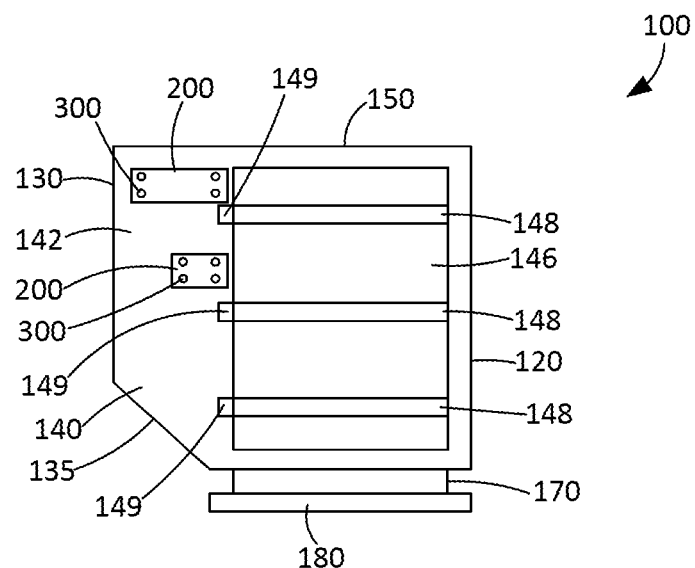
FIG. 3 is a side view of a unit load device in accordance with an embodiment of the invention.

FIG. 3 shows side 140 of exemplary ULD 100. Side 140, in this example, includes an access opening in ULD 100 that allows cargo to be placed in, and removed from, ULD 100. In this example, side 140 has an opening that is coverable by a flexible curtain 146. Curtain 146 is held in the closed position (as shown) by, in this example, three straps 148 having buckles (or other attachment devices) 149. Buckles 149 are disconnected from side 140 of ULD 100 to allow flexible curtain 146 to be moved into an open position (to the right in FIG. 3). Along with flexible curtain 146, side 140 has a rigid section 142. In this example, rigid section 142 has two removable panels 200 mounted to it by fasteners 300. Although removable panels 200 are shown mounted on rigid section 142 in this example, it is noted that one or more of the removable panels 200 can be mounted to any of the sides 110, 120, 130, 140, sloped surface 135, top 150, bottom 160, or any other location on ULD 100.

Figure 4:
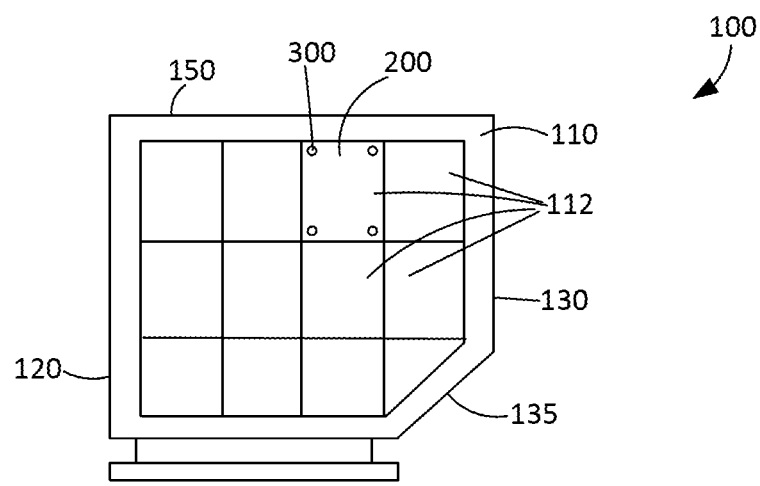
FIG. 4 is a side view of a unit load device in accordance with an embodiment of the invention.

FIG. 4 shows another example of exemplary ULD 100. In this example, side 110 comprises a plurality of panels 112. Exemplary panels 112 are removable and replaceable so that if a particular panel is damaged, it alone can be replaced without requiring replacement of the entire side 110 or the entire ULD 100. Making panels 112 replaceable also allows ULD 100 to be upgraded by replacing one or more of panels 112 when new and/or improved designs are available. In FIG. 4, one of the panels 112 is a removable panel 200 similar to removable panel 200 shown in FIG. 3. The removable nature of removable panels 200 allows for easy replacement in the event a panel is damaged or updated technology or design makes it advantageous to replace a panel.

Figure 5:
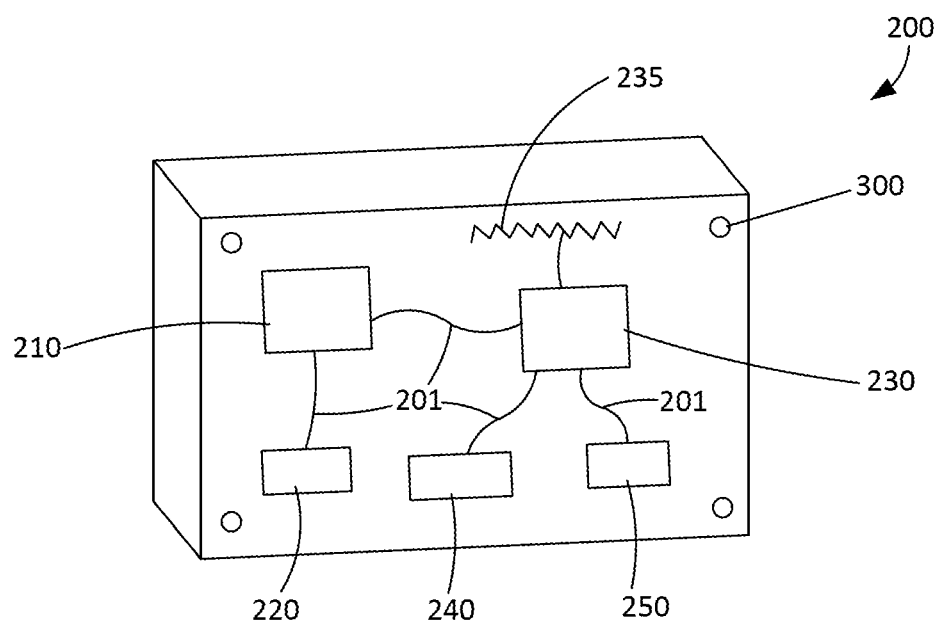
FIG. 5 is a front schematic view of a replaceable panel in accordance with an embodiment of the invention.
Figure 6:
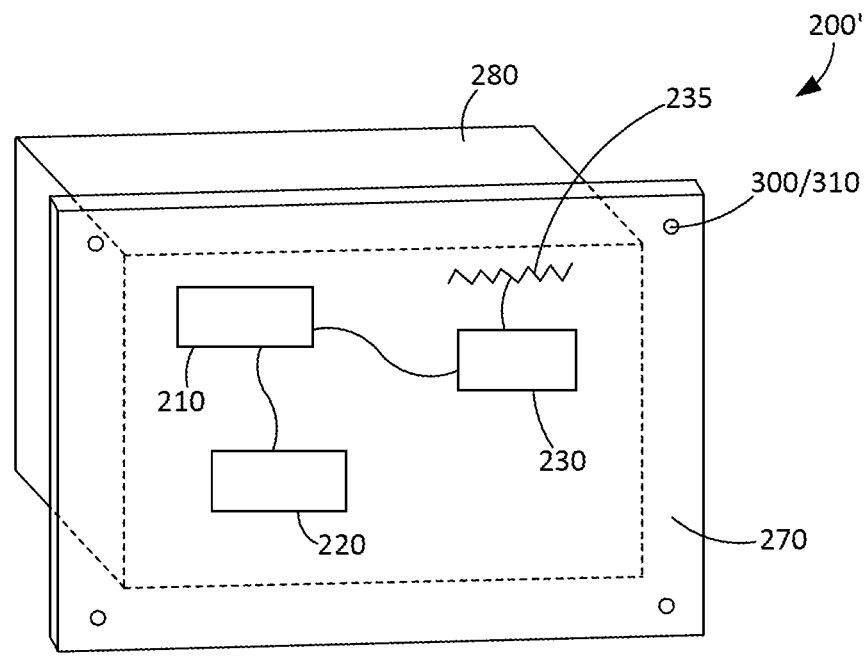
FIG. 6 is a front schematic view of a replaceable panel in accordance with an embodiment of the invention.
Figure 7:
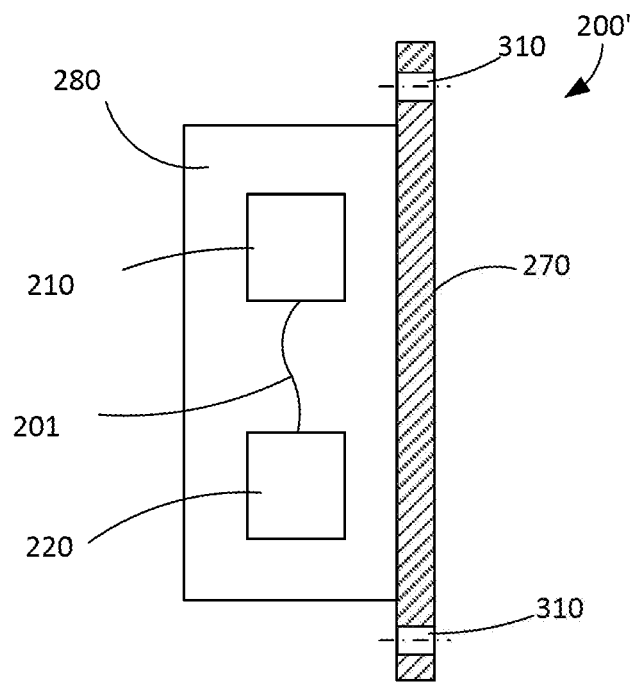
FIG. 7 is a side schematic view of a replaceable panel in accordance with an embodiment of the invention.

FIGS. 5-7 show two examples of exemplary removable panels 200 in accordance with embodiments of the invention. As stated above, it can be advantageous to build various electronic devices into a ULD. Such devices, or portions of such devices, can be contained within one or more removable panels 200.

In more detail, FIG. 5 shows schematically an example of several devices that can be contained in, or mounted on, removable panel 200. In this example, exemplary removable panel 200 has four mounting holes 300 used to secure removable panel 200 to ULD 100. Fewer or more mounting holes can be provided and they can be used for any appropriate removable fasteners such as, for example, screws, bolts, pins, or quarter-turn fasteners. FIG. 5 shows an electrical power storage device 210 that is connected by a wire 201 to a processor 230. Electrical power storage device 210 can be a battery, capacitor, or other type of fuel cell or storage device for electrical power. Processor 230 can be any type of processor, for example a microprocessor, powered by electricity and can have one or more electrical devices connected to it. In this example, a sensor 240 and a radio transmitter 250 are connected to and controlled by processor 230. Although wires 201 are shown connecting the various components and devices to each other in FIG. 5, it is noted that wireless connections can also be used. Also shown in FIG. 5 is an antenna 235 that can be used to transmit and receive information between removable panel 200 and another device.

Non-exclusive examples of information gathered by sensor 240 are light detection, smoke detection, chemical detection, cargo weight, weight shift and movement detection, acceleration (shock) detection, temperature detection, and pressure detection. Depending on the information required, more than one sensor 240 can be provided. Although sensor 240 is shown located in removable panel 200, various sensors 240 can alternatively be mounted at other locations in or on ULD 100 so that the particular sensor can better detect the parameter being detected. If a particular sensor 240 is located remotely from removable panel 200, then a wired or wireless connection between that sensor and processor 230 is provided.

Non-exclusive examples of radio transmitter 250 are transmitters such as Bluetooth, RFID, WiFi, cellular, and ZigBee. Radio transmitter 250 transmits information to a receiver located on the plane (or other vehicle) or at some other location such as, for example, a hand held device held by an operator or a land-based central information center.

A memory storage device can be provided as part of processor 230 or as a separate device. The memory storage device can store an identification number or code so that the identification of the ULD can be easily discovered or verified. Further, these devices can include other information. This information can include the type of contents of the ULD such as, for example, contents that are hazardous, need refrigeration, are controlled by special regulations, or have specific temperature of pressure limitations. This information can also include the specific contents of the ULD such as, for example, customer name, customer address, and detailed contents of each package in the ULD. Other non-exclusive examples of information that can be stored in an electronic device on a ULD are destination, current flight number, connecting flight number, actual minimum and maximum temperatures observed by the ULD, actual minimum and maximum pressures observed by the ULD, actual maximum acceleration observed by the ULD (as a measure of shock), and other information.

Also shown in FIG. 5 is an electrical charging device 220 that charges electrical power storage device 210. Electrical charging device 220 can be any charging device that can charge electrical power storage device 210. Electrical charging device 220 can be a simple battery charger that is plugged into a power outlet either on a plane or at a land-based facility. Electrical charging device 220 can be a solar panel or other solar energy charging device. If electrical charging device 220 is not itself a solar panel, a solar panel can be attached at another location on ULD 100 that is more likely to be in contact with solar energy and an electrical connection can be provided between the solar panel(s) and electrical charging device 220. Electrical charging device 220 can be a kinetic movement charger that generates power from movement of the ULD. Kinetic movement chargers can be particularly useful in this application because of the frequent movement present on a plane or other transport vehicle. Some kinetic movement chargers can generate power from vibrations, such as those often present on a plane or other vehicle. Induction chargers can be used as electrical charging device 220 in order to provide charging without requiring a physical electrical wire connection between electrical charging device 220 and the source of the charging power. The source of the induction charging power can be hung on (or otherwise attached to) ULD 100 in proximity to electrical charging device 220 while ULD 100 is being loaded with cargo or other times when ULD 100 is not on the plane. In some cases, it might be advantageous to transfer electrical power from the induction power source while ULD 100 is on the plane. Electrical charging device 220 can use ambient radio frequency (RF) charging to take advantage of the ambient RF signals that are emitted from numerous sources. An RF charger can also generate charging power from RF signals intentionally generated for that purpose.

Including an electrical charging device on removable panel 200 greatly increases the utility of an exemplary ULD because it reduces or eliminates down time of the ULD for charging the electrical power storage device. If the ULD's electrical power storage device needs to be charged by connecting the ULD to an external charging device, the ULD can be out of service for the duration of the charging. By providing electrical charging device 220, no such down time is required or the down time is at least minimized.

FIGS. 6 and 7 show an example of another exemplary removable panel 200' that is functionally similar to exemplary removable panel 200, but includes a flange 270 to facilitate attachment of removable panel 200' to ULD 100. FIG. 7 shows a housing 280 that can contain the various devices. Although a different number of devices are shown on removable panels 200 and 200', it is noted that either panel design can have any number of any of the devices shown in either Figure. Further, either panel design can have any number of any of the devices discussed or mentioned, and any number of any other device and still be within the intent of the disclosure.

Figure 8:
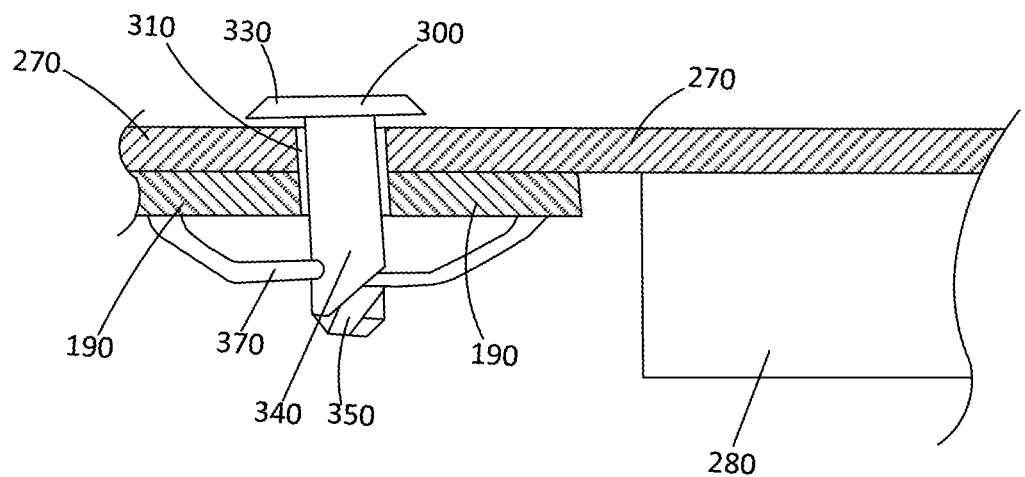
FIG. 8 is a detail view of a connector connecting a replaceable panel to a unit load device in accordance with an embodiment of the invention.

Removable panels 200 and 200' are shown with a plurality, four in these examples, of holes 310. Holes 310 are provided for fastening removable panels 200, 200' to ULD 100. Removable panels 200, 200' can be fastened to ULD 100 by way of screws, bolts, or any other removable fastener. One embodiment uses a quarter-turn fastener that is inserted into a hole 310 and when turned 90 degrees engages a wire located behind the structure to which removable panel 200, 200' is being fastened to. FIG. 8 shows an example of a quarter-turn fastener 300 in place securing flange 270 of removable panel 200' to structure 190 of ULD 100. To fasten removable panel 200' to structure 190, hole 310 is aligned with a corresponding hole in structure 190 and a shaft 340 of quarter-turn fastener 300 is inserted into the holes. As groves 350 (located 180 degrees from each other) contact a wire 370 located behind structure 190, a head 330 of quarter-turn fastener 300 is turned clock-wise as quarter-turn fastener 300 is pushed into the holes. This turning motion cause grooves 350 to grip wire 370 and pull quarter-turn fastener 300 further into the holes until head 330 is tightly pressed against flange 270. Quarter-turn fasteners 300 provide a secure mounting method that is quick to install and will not release when subjected to vibration. Head 330 can have a groove or other feature for engaging by a tool such as, for example, a flat head screw driver. Head 330 can also have a wire bail or other feature that enables a user to grip head 330 and turn it without the use of a tool.

It should be emphasized that the sequence of operations to perform any of the methods and variations of the methods described in the embodiments herein are merely exemplary, and that a variety of sequences of operations may be followed while still being true and in accordance with the principles of the present invention.

At least some portions of exemplary embodiments outlined above may be used in association with portions of other exemplary embodiments. Moreover, at least some of the exemplary embodiments disclosed herein may be used independently from one another and/or in combination with one another and may have applications to devices and methods not disclosed herein.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A replaceable charging panel for a unit load device, the unit load device having a plurality of walls, the replaceable charging panel comprising:
   a base member that is configured to removably attach to a first wall of the plurality of walls of the unit load device and is configured to be a portion of the first wall;
   an electronic device mounted to the base member, the electronic device comprising:
   an electrical charging device;
   a memory storage device that stores an identification number identifying the unit load device and information regarding the contents of the unit load device; and
   a wireless communication device that communicates information regarding the contents of the unit load device that is stored in the memory storage device.

2. The replaceable charging panel of claim 1, wherein the base member is configured to be one of several removable panels that together form a part of the first wall.

3. The replaceable charging panel of claim 1, further comprising an electric power source mounted to the base member.

4. The replaceable charging panel of claim 3, wherein the electric charging device charges the electric power source.

5. The replaceable charging panel of claim 1, wherein the electric charging device is one of a solar panel, a kinetic movement charger, an induction charging panel, an ambient RF charger, and replaceable batteries.

6. The replaceable charging panel of claim 1, further comprising a sensor that is configured to sense a parameter of the unit load device.

7. The replaceable charging panel of claim 6, wherein the sensor detects one of light, smoke, chemicals, cargo weight, weight shift, movement, temperature, and pressure.

8. The replaceable charging panel of claim 1, wherein the plurality of walls includes a side wall, a top wall, and a bottom wall, and
   the first wall is the side wall.

9. The replaceable charging panel of claim 1, further comprising quick attachment connectors that are configured to removably attach the replaceable charging panel to the unit load device.

10. The replaceable charging panel of claim 9, wherein the quick attachment connectors are turnlock fasteners.

11. A unit load device comprising:
    a plurality of walls; and
    a replaceable charging panel having
    a base member that is removably attach to a first wall of the plurality of walls and is a portion of the first wall,
    an electrical device mounted to the base member, the electronic device comprising:
    an electrical charging device;
    a memory storage device that stores an identification number identifying the unit load device and information regarding the contents of the unit load device; and
    a wireless communication device that communicates information regarding the contents of the unit load device that is stored in the memory storage device.

12. The unit load device of claim 11, wherein the base member is one of several removable panels that together form a part of the first wall.

13. The unit load device of claim 11, further comprising an electric power source mounted to the base member.

14. The unit load device of claim 13, wherein the electric charging device charges the electric power source.

15. The unit load device of claim 11, wherein the electric charging device is one of a solar panel, a kinetic movement charger, an induction charging panel, an ambient RF charger, and replaceable batteries.

16. The unit load device of claim 11, further comprising a sensor that senses a parameter of the unit load device.

17. The unit load device of claim 16, wherein the sensor detects one of light, smoke, chemicals, cargo weight, weight shift, movement, temperature, and pressure.

18. The unit load device of claim 11, wherein the plurality of walls includes a side wall, a top wall, and a bottom wall, and
    the first wall is the side wall.

19. The unit load device of claim 11, further comprising quick attachment connectors that removably attach the replaceable charging panel to the unit load device.

20. The unit load device of claim 19, wherein the quick attachment connectors are turnlock fasteners.

21. A mounting device configured to mount a replaceable charging panel to a unit load device, the unit load device having a plurality of walls, the replaceable charging panel having a base member that is removably attachable to a first wall of the plurality of walls of the unit load device and that is a portion of the first wall, the replaceable charging panel having an electronic device mounted to the base member, the electronic device comprising an electrical charging device, a memory storage device that stores an identification number identifying the unit load device and information regarding the contents of the unit load device, and a wireless communication device that communicates information regarding the contents of the unit load device that are stored in the memory storage device, the mounting device comprising:
    a receiving member attached to the first wall of the unit load device, the receiving member being configured to receive the base member;
    a fastener that is configured to extend through the base member and the receiving member; and
    a fastener receiving part attached to the unit load device, the fastener receiving part receiving the fastener such that the fastener removably attaches the base member of the replaceable charging panel to the unit load device when the fastener engages the fastener receiving part, wherein the fastener and the fastener receiving part transition from an unengaged position to a fully engaged position when the fastener is rotated less than 180 degrees relative to the fastener receiving part.

22. The mounting device of claim 21, wherein the fastener and the fastener receiving part transition from the unengaged position to the fully engaged position when the fastener is rotated less approximately 90 degrees relative to the fastener receiving part.

* * * * *